US009825434B2

(12) United States Patent
Heid et al.

(10) Patent No.: US 9,825,434 B2
(45) Date of Patent: Nov. 21, 2017

(54) SPARK GAP COMPRISING A CAPACITIVE ENERGY STORE

(75) Inventors: Oliver Heid, Erlangen (DE); Timothy Hughes, Erlangen (DE); Jennifer Sirtl, Fürth (DE)

(73) Assignee: SIEMENS AKTIENGESELLSCHAFT (DE)

( * ) Notice: Subject to any disclaimer, the term of this patent is extended or adjusted under 35 U.S.C. 154(b) by 105 days.

(21) Appl. No.: 14/412,703

(22) PCT Filed: Jul. 11, 2012

(86) PCT No.: PCT/EP2012/063555
§ 371 (c)(1),
(2), (4) Date: Jan. 5, 2015

(87) PCT Pub. No.: WO2013/178292
PCT Pub. Date: Dec. 5, 2013

(65) Prior Publication Data
US 2015/0249322 A1 Sep. 3, 2015

(30) Foreign Application Priority Data

May 30, 2012 (DE) .................. 10 2012 209 115

(51) Int. Cl.
*H01J 35/22* (2006.01)
*H01T 15/00* (2006.01)
(Continued)

(52) U.S. Cl.
CPC ............. *H01T 15/00* (2013.01); *H01J 35/22* (2013.01); *H01T 1/20* (2013.01); *H01T 2/00* (2013.01);
(Continued)

(58) Field of Classification Search
CPC ...................... H01J 2235/08; H01J 35/22
See application file for complete search history.

(56) References Cited

U.S. PATENT DOCUMENTS 2,924,714 A * 2/1960 Davis ....................... G21K 1/00
164/DIG. 4
3,087,091 A * 4/1963 McFarland ............... H01T 2/02
313/249
(Continued)

FOREIGN PATENT DOCUMENTS

CN 1674205 A 9/2005
DE 3308522 A1 9/1984
(Continued)

OTHER PUBLICATIONS

Japanese Office Action dated May 9, 2016; Application No. 2015-514368; 6 pgs.
(Continued)

*Primary Examiner* — David J Makiya
*Assistant Examiner* — Soorena Kefayati
(74) *Attorney, Agent, or Firm* — Schmeiser Olsen & Watts LLP

(57) ABSTRACT

A spark gap including a capacitive energy store is provided. The spark gap is fed via a multiplicity of capacitors arranged in a form of a ring, wherein the capacitors are electrically connected to the anode and the cathode via ring-shaped and conical or funnel-shaped conductors. As a result, sudden changes in impedance can be avoided. At the same time, it is possible to realize as large a cross-sectional area of the conductor as possible within a very small space. Therefore, the spark gap has a switching response with a high rate of rise of the voltage pulse as soon as the spark gaps flash over. This results in an easily predictable switching response of the spark gap. The spark gap can be used, for example, to generate pulses of monochromatic X-ray radiation.

8 Claims, 2 Drawing Sheets

(51) Int. Cl.
*H01T 1/20* (2006.01)
*H01T 2/00* (2006.01)
*H05G 1/24* (2006.01)
*H01G 4/02* (2006.01)

(52) U.S. Cl.
CPC ............... *H05G 1/24* (2013.01); *H01G 4/02* (2013.01); *H01J 2235/166* (2013.01)

(56) References Cited

U.S. PATENT DOCUMENTS

| | | | | |
|---|---|---|---|---|
| 3,097,330 A * | 7/1963 | Fischer | ............... | H01G 4/228 361/275.1 |
| 3,353,064 A * | 11/1967 | Kitchen | ............... | H03K 3/537 315/239 |
| 3,475,646 A * | 10/1969 | Chapman | ............... | H01J 61/00 313/110 |
| 4,412,967 A * | 11/1983 | Winterberg | ............... | H05H 5/06 175/16 |
| 4,549,114 A | 10/1985 | Herden | | |
| 4,680,671 A * | 7/1987 | Brion | ............... | H02J 15/00 315/227 R |
| 4,990,831 A * | 2/1991 | Thayer, III | ............... | H01T 2/00 313/231.01 |
| 6,205,200 B1 * | 3/2001 | Boyer | ............... | H05G 1/06 378/101 |
| 2006/0037516 A1 | 2/2006 | Moeny | | |

FOREIGN PATENT DOCUMENTS

| | | |
|---|---|---|
| GB | 1283318 A | 7/1972 |
| JP | S63165924 | 4/1987 |
| JP | S6388794 A | 4/1988 |
| JP | S63308896 A | 12/1988 |

OTHER PUBLICATIONS

Eiichi Sato et al: 11 IK-edge Angeographie Utilizing a Tungsten Plasma X-Ray Generator Generator in Conjunktion with Gadolinium-based Contrast Median. Radiation Physics and Chemistry. Elsevier Science Publishers BV. Amsterdam NL. vol. 75. Jan. 1, 2006 (Jan. 1, 2006). pp. 1841-1849.

International Search Report; PCT/EP2012/063555; dated Jul. 11, 2012; Siemens Aktiengesellschaft, 3 pgs.

Enhanced K-edge angiography uutilizing a super-fluorescent x-ray generator with a gadolinium-target tube; Eiichi Sato et al. Enhanced K-edge angiography uutilizing a super-fluorescent x-ray generator with a gadolinium-target tube 27th International Congress on High-Speed Photography and Photonics Proc. of SPIE vol. 6279 627911-2 2007.

Japanese Office Action dated Jan. 23, 2017; Application No. 2015-514368: 7 PGS.

Eiiohi Sato et al.: Enhanced K-Edge Angiography Utilizing a Super-Fluorescent X-Ray Generator With a Gadolinium-Target Tube; 27th International Congress on High.Speed Photography and Photonics, edited by Xun Hou, Wei Zhao, Baoli Yao; SPIE vol. 6279, 627911, (2007).

\* cited by examiner

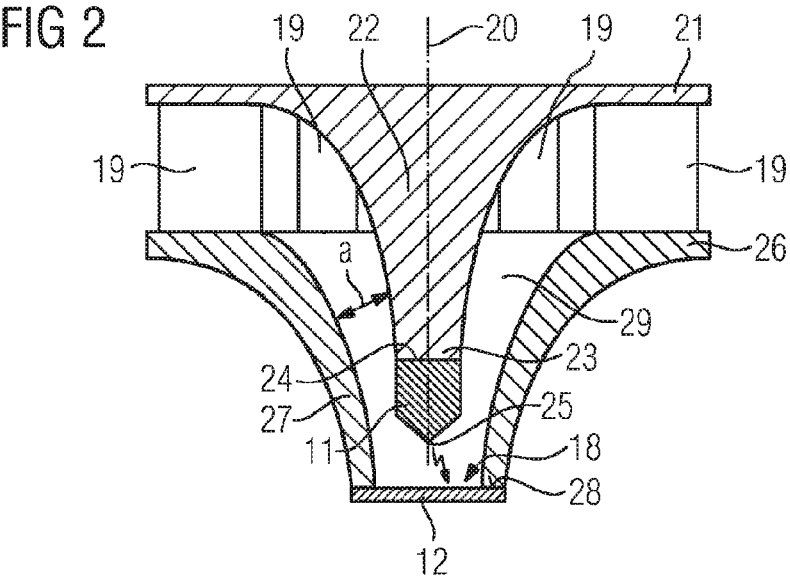
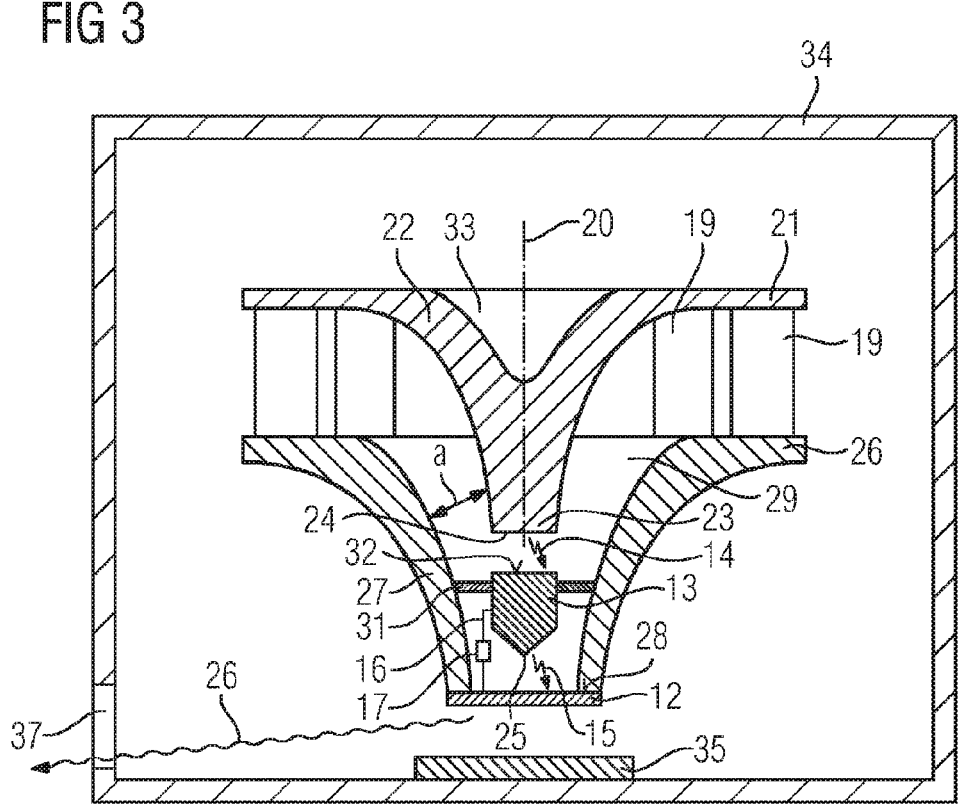

SPARK GAP COMPRISING A CAPACITIVE ENERGY STORE

CROSS-REFERENCE TO RELATED APPLICATION

This application claims priority to PCT Application No. PCT/EP2012/063555, having a filing date of Jul. 11, 2012, based off of DE 102012209115.7 having a filing date of May 30, 2012, the entire contents of which are hereby incorporated by reference.

FIELD OF TECHNOLOGY

The following relates to a spark gap, which is located between an anode and a cathode, wherein a capacitive energy store is used for striking the spark gap.

BACKGROUND

Spark gaps of the type mentioned at the outset are known in accordance with Eiichi Sato et al.: "K-edge Angiography Utilizing a Tungsten Plasma X-Ray Generator in Conjunction with Gadolinium-based Contrast Media", Radiation Physics and Chemistry 75 (2006) pages 1841 to 1849. In this case, a high-voltage source in which a high-voltage capacitor provides the energy is used for generating a flash X-ray generator for high-speed radiography. Said high-voltage capacitor is connected to the cathode of the X-ray tube using four coaxial cables.

If X-rays are intended to be produced in a commercially exploitable dose, high capacitances need to be stored for generating the flash of X-ray radiation. In this case, the electrical connection of the available capacitor capacitance is a problem.

SUMMARY

An aspect relates to specifying a spark gap, for example suitable for an X-ray generator, in which the rate of rise of the generated pulses is as high as possible. A spark gap specified at the outset by virtue of the fact that a multiplicity of capacitors, which are connected in parallel and which are arranged concentrically in a ring having in each case the same axial orientation of the capacitor poles, is provided as energy store, wherein the electrical connections between the capacitors and the anode and between the capacitors and the cathode are each configured such that all of the capacitors with the same impedance are connected to the anode and to the cathode. By virtue of the arrangement according to embodiments of the invention of a plurality of capacitors, it is possible to increase the available capacitance for switching an X-ray tube, for example, in an advantageous manner. In order that a switching operation can be driven with the required rate of rise of the voltage pulse, provision is advantageously made for the impedance of the electrical connections of all of the capacitors to be the same and for the distances to be kept as short as possible by virtue of the ring-shaped arrangement around the spark gap, so that the impedance is low and there is no sudden change in impedance. Advantageously, a high rate of rise of the voltage pulse can thus be guaranteed, as a result of which a short, quick switching response of the spark gap can also be achieved. This is of primary significance inter alia for the predictability of the striking response of the spark gap. The spark gap can therefore advantageously also be used to operate flash X-ray generators, for example.

In accordance with an advantageous configuration of the invention, provision is made for the electrical connection to the cathode to have a connection ring, which is connected to the capacitor poles of the same polarity of all of the capacitors. This connection ring advantageously enables a connection of the capacitors within a very small space, with the result that said capacitors can be arranged in the form of a ring, wall on wall. At the same time, the ring provides the greatest possible geometrical cross-sectional area for the conduction of current, with the result that the impedance of the ring-shaped connection region is very low. Furthermore, provision can advantageously be made for the connection ring to open out into a conical region on the inner side of said connection ring, the point of said conical region being connected to the cathode or forming said cathode. The conical region furthermore enables conduction or the current towards the cathode without any sudden changes in the impedance, with the result that there are no reflections of energy on the section of line which have a negative effect on the energy transport response. At the same time, this arrangement likewise ensures a very compact design. The point of the conical region can act as cathode. However, it is also advantageous to manufacture said cathode from another material and to connect it to the conical region. The conical region can then be configured in terms of its electrical properties, while the anode is produced from a material which withstands the electrical loading of the spark gap as long as possible. In addition, the cathode can also be replaced.

In accordance with another advantageous configuration of embodiments of the invention, provision is made for the electrical connection to the anode to have a connection ring, which is connected to the capacitor poles of the same polarity of all of the capacitors. This geometric configuration corresponds to those which have already been explained above for the connection to the cathode. In this case, too, given a simultaneously compact design, a maximum cross-sectional area can be realized without any sudden changes in impedance of the electrical conductor.

In accordance with one configuration of the last-mentioned connection ring, provision is made for the connection ring to open out into a funnel on the inner side of said connection ring, the wall of said funnel acting as electrical connection, and the anode being arranged in the smaller funnel opening of said funnel. This is therefore an electrical conductor which is comparable in terms of its design to a funnel-shaped, tapering tube. The smaller funnel opening is to this extent suitable, in particular with the end side formed by the funnel wall, for connection of the anode. The anode is in the form of a film and is fastened in an electrically conductive manner. In this case, too, replacement is easily possible since the anode acts as target, for example during generation of X-ray radiation, and is subjected to a certain amount of wear.

In order to achieve an even more compact design, it is advantageous if the capacitors are arranged in a plurality of concentric circles. In this case, too, electrical conduction without any sudden changes in impedance can be realized by the ring-shaped connection to the electrical conductors.

In accordance with a further configuration of the invention, provision can be made for the spark gap to have a high-pressure spark gap and a useful spark gap, which are connected to one another by a central piece. In this case, the spark gap is formed between the cathode and the central piece. The central piece is connected to the anode via a line, in which an electrical resistor is provided. The useful spark gap is formed between the central piece and the anode. This arrangement advantageously enables a very defined striking point with an advantageous, clear striking voltage increase. This results in an increased flow of electron flow.

The arrangement of the high-pressure spark gap and the useful spark gap is a series circuit. However, the central piece is connected to the anode via the resistor. In order to strike the useful spark gap, an increasing voltage is applied to the entire arrangement. Since the high-pressure spark gap is filled with a gas which is under elevated pressure, a comparatively high flashover potential is ensured here. While the voltage increases, there is still no switching-relevant potential difference present at the useful spark gap since both the central piece and the anode, connected via the resistor, have the same potential. As soon as the comparatively defined switching point of the high-pressure spark gap has been reached, said spark gap is struck. In the case of flashover in the high-pressure spark gap, an arc then forms, which is equivalent to a low-impedance connection between the cathode and the central piece. Therefore, there is a potential suddenly at the useful spark gap which is markedly above the required striking potential of the useful spark gap. By virtue of the voltage gradient with a very steep profile, a marked excessive increase in voltage at the useful spark gap in relation to the actual striking voltage is achieved. The useful spark gap therefore strikes reliably at the defined time owing to the chain reaction which is set in motion. By virtue of the striking of the high-pressure spark gap, the required voltage is now available instantaneously (the rate of rise of the time/voltage profile is very high).

In accordance with one configuration of the invention, the resistor has a value of 100 to 1000 MΩ. In this case it is ensured that switching of the useful spark gap takes place since the applied voltage cannot be decayed via the line which connects the central piece to the anode owing to the high resistance.

In accordance with another configuration of the invention provision is made for the useful spark gap to be provided for generating X-ray radiation. The anode is used as target for generating the X-ray radiation. Thus, the X-ray radiation can be made available at a defined time. This is an important precondition for various applications. For example, the X-ray radiation can be used for imaging methods.

In accordance with a particular configuration of the invention, provision is made for it to be possible for monochromatic X-ray radiation to be generated by the anode. If a useful spark gap is used for generating the monochromatic X-ray radiation, advantageously a sufficiently high pulse can be made available for the generation in order that monochromatic X-ray radiation is made available to an extent which is sufficient for the intended investigation purposes. Monochromatic X-ray radiation can be generated, for example, when a very thin metal film, for example consisting of aluminum or another light metal, is used as target. The lanthanoids can also be used as target material. Within the meaning of the application, light metals are the metals and alloys thereof which have a density of below 5 g/cm³. Specifically, this definition applies to the following light metals: all alkali metals, all alkaline earth metals excluding radium, in addition scandium, yttrium, titanium and aluminum. Other advantageous groups of materials for forming the metal film are tungsten, molybdenum and the group of lanthanoids. Specifically, this is the element lanthanum and the 14 elements following lanthanum in the periodic table.

In order to technically realize an in particular monochromatic X-ray radiation source, it is advantageous if the useful spark gap is accommodated in an evacuable housing, in which a collector is also provided and out of which the X-ray radiation can be coupled. The collector serves the purpose of electrostatically decelerating the electrons of the electron flow and of capturing the decelerated electrons. In this way, high-energy electrons are prevented from being able to generate bremsstrahlung by impinging on material. The monochromatic X-ray radiation can be coupled out of the housing; for example, a window which is transmissive to X-ray radiation is provided in the housing wall for this purpose.

Furthermore, it is advantageous if the cathode, the central piece and the anode are arranged coaxially. It is moreover advantageous if the cathode, the central piece and the anode are formed centrally-symmetrical with respect to the common axis. As a result, inductances which would negatively influence the switching response and the energy flow are avoided.

BRIEF DESCRIPTION

Some of the embodiments will be described in detail, with reference to the following figures, wherein like designations denote like members, wherein:

FIG. 2 shows a cross-sectional schematic view of a geometric configuration of an exemplary embodiment of the spark gap; and FIG. 3 shows a cross-sectional schematic view of a geometric configuration of the exemplary embodiment of the spark gap as shown in FIG. 1.

DETAILED DESCRIPTION

Figure 1:
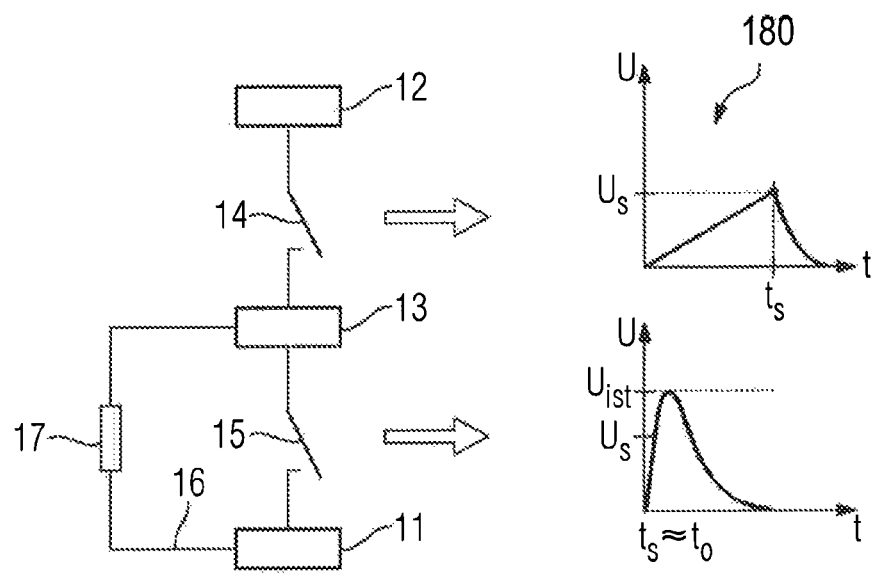
FIG. 1 shows a schematic view of an exemplary embodiment of a spark gap with an illustration of the switching operation, wherein a high-pressure spark gap and a useful spark gap are used, without the collector.

FIG. 1 shows the design of the spark gap according to the invention. Said spark gap has an anode 11 and a cathode 12. A central piece 13 is connected between the anode 11 and the cathode 12, with the result that two spark gaps, namely a first or high-pressure spark gap 14 and a second or useful spark gap 15. In addition, the central piece 13, which acts as cathode for the useful spark gap 15, is electrically connected to the anode via a line 16 and the resistor 17.

For the high-pressure spark gap, for which a gas fill with an elevated pressure is used, the central piece 13 forms the cathode. Inert gases such as, for example, xenon can be used as fill gases for the high-pressure spark gap. The high-pressure spark gap demonstrates the defined switching response 180, wherein, in the case of a defined voltage increase U, the switching point is reached after a defined time t. At the switching point ($t_s/U_s$), the switching time of the useful spark gap can be predicted comparatively precisely.

As already explained, in the case of the switching of the high-pressure spark gap, the necessary switching potential for switching the useful spark gap 15 is immediately available. Owing to the low-resistance characteristic of the high-pressure spark gap 14, the central piece 13 has cathode potential at the switching time of the high-pressure spark gap 14. The total voltage is now present between the cathode and the anode at the resistor 17. A current defined by the resistance value of the resistor 17 flows through the resistor. The parasitic inductances of the resistor 17 reduce the system-related current flow through the resistor 17 additionally. By virtue of the steep voltage increase between the central piece 13 and the anode 11, the flashover response of the useful spark gap 15 is positively influenced so that a much higher voltage is present at the flashover time of the useful spark gap 15 than would be possible owing to conventional striking with a low voltage increase gradient. The switching of the useful spark gap 15 at time $t_s$ is approximately $t_0$ since the voltage increase is extremely steep owing to the low inductance of the arrangement. The required switching potential $U_s$ of the useful spark gap 15 is clearly surpassed by the extremely steep voltage gradient. As a result, a voltage which is much higher than the striking voltage is present at the useful spark gap within a very short period of time (within nanoseconds). Thus, a severe flashover forms through the anode. The breakdown voltage of the useful spark gap 15 is no longer primarily dependent on $U_s$ owing to this arrangement, which is substantially dependent on the geometry and the vacuum, but on the externally applied anode voltage and the corresponding design of the high-pressure spark gap 14. The duration of the discharge of the useful spark gap is determined by the capacitance of the arrangement and the energy stored therein and the parasitic inductances in the setup.

FIG. 2 illustrates a simple setup of an exemplary embodiment of another spark gap 18 according to embodiments of the invention. This spark gap is fed by eight capacitors 19, of which only five can be seen owing to the sectional illustration. These capacitors are arranged on an imaginary concentric circle around the center axis 20 of the arrangement. These polarities are likewise oriented on a central axis. One pole of the capacitors 19 is located in each case on a connection ring 21, which merges with a conical region 22 on the inner side of said connection ring. The conical shape can have different lateral surface areas. What is illustrated is a fluid transition which is similar to a radius in the cross section illustrated. This is particularly advantageous because sudden changes in impedance in the electrical conductor can best be prevented in this way. The cone ends with its "pointed" end 23 in a flattened contact area 24, where the cathode 12 is fastened. The contact area of both the cathode 12 and the flattened point 23 of the cone are circular. The cathode also has a point 25, which serves to form the flashover of the spark gap 18. This point 25 is opposite the anode 11 in the form of a very thin film or a target which is suitable in another way for generating monochromatic X-ray radiation.

The respective other polarity of the capacitors 19 is likewise combined on a connection ring 26. Said connection ring opens out into a funnel 27 on the inner side of said connection ring. The funnel 27 has an end face 28 at its very small opening, with the anode 11 being electrically conductively connected to said end face. An interior 29 of the funnel is formed by its diameter profile such that a minimum spacing a between the conical region 22 and the inner wall of the funnel 27 is maintained. This spacing ensures that the striking of an arc takes place between the point 25 of the cathode 12 and the anode 11 and not between the conical region 22 and the funnel 27.

The spark gap shown in FIG. 3 differs from that shown in FIG. 2 in that said spark gap, as shown in FIG. 1, is divided into the high-pressure spark gap 14 and the useful spark gap 15. A higher pressure prevails in the high-pressure spark gap, for which reason a partition wall 31 is inserted between the spark gaps. Said partition wall is electrically insulating. In addition, the resistor 17 is shown, which is connected both to the central piece 13 and to the anode 11 via the line 16. In contrast to the arrangement shown in FIG. 2, the central piece 13 with its point 25 forms the cathode for the useful spark gap and, at the same time, with the flattened side 32, forms the anode for the high-pressure spark gap.

In addition, FIG. 3 shows that two concentric rings of capacitors 19 are arranged.

The spark gap is built into an X-ray radiation source. For this purpose, there is a housing 34, which also accommodates a collector 35 in addition to the spark gap. Said collector is used for electrostatically decelerating the electrons and for capturing and discharging the decelerated electrons. Therefore, the production of bremsstrahlung is prevented. The X-ray radiation 260 generated is coupled out through a window 37 in the housing 34.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A spark gap device comprising:
an anode and a cathode, wherein a capacitive energy store is used for striking the spark gap, and wherein a multiplicity of capacitors, which are connected in parallel and which are arranged concentrically about an axis in at least one of a ring and in a form of two concentric rings, having in each case a same axial orientation of capacitor poles, is provided as energy store, further wherein an electrical connection to the cathode has a connection ring, which is connected to the capacitor poles of a same polarity of all of the multiplicity of capacitors, and the electrical connection to the anode has a further connection ring, which is connected to the capacitor poles of the same polarity of all of the multiplicity of capacitors.

2. The spark gap device as claimed in claim 1, wherein the connection ring opens out into a conical region on an inner side of the connection ring, a point of the conical region being at least one of connected to the cathode and forming the cathode.

3. The spark gap device as claimed in claim 1, wherein the further connection ring opens out into a funnel on an inner side of the connection ring, a wall of the funnel acting as the electrical connection, and the anode being arranged in a smaller funnel opening of the funnel.

4. The spark gap device as claimed in claim 3, wherein the anode is in a form of a film or is provided with a target which is in another way suitable for generating monochromatic X-ray radiation, wherein the anode is electrically conductively fastened on an end side of the wall of the funnel which surrounds the smaller funnel opening.

5. The spark gap device as claimed in claim 1, wherein the multiplicity of capacitors are arranged in a plurality of concentric rings.

6. The spark gap device as claimed in claim 1, wherein the spark gap has a first spark gap and a second gap, which are connected to one another by a central piece, wherein the first spark gap is formed between the cathode and the central piece, the central piece is connected to the anode via a line, in which an electrical resistor is provided, and the second spark gap is formed between the central piece and the anode.

7. The spark gap device as claimed in claim 1, wherein the spark gap is provided for generating X-ray radiation, wherein the anode is used as target for generating the X-ray radiation.

8. The spark gap device as claimed in claim 7, wherein monochromatic X-ray radiation is generated by the anode.

* * * * *